United States Patent
Salter et al.

(10) Patent No.: US 9,975,476 B2
(45) Date of Patent: May 22, 2018

(54) ILLUMINATED VEHICLE FOOT PEDAL ASSEMBLY

(71) Applicant: Ford Global Technologies, LLC, Dearborn, MI (US)

(72) Inventors: Stuart C. Salter, White Lake, MI (US); Pietro Buttolo, Dearborn Heights, MI (US); Christopher Anthony Danowski, Rochester, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/291,302

(22) Filed: Oct. 12, 2016

(65) Prior Publication Data
US 2018/0099607 A1 Apr. 12, 2018

(51) Int. Cl.
*B60Q 1/00* (2006.01)
*B60Q 3/02* (2006.01)
*G05G 1/44* (2008.04)
*G01B 7/14* (2006.01)

(52) U.S. Cl.
CPC ............. *B60Q 3/0243* (2013.01); *G01B 7/14* (2013.01); *G05G 1/44* (2013.01); *B60Q 2500/00* (2013.01)

(58) Field of Classification Search
CPC ........... B60Q 3/0243; G01B 7/14; G05B 1/44
USPC ........................................................ 340/438
See application file for complete search history.

(56) References Cited

U.S. PATENT DOCUMENTS

| | | | |
|---|---|---|---|
| 5,206,562 A | 4/1993 | Matsuno et al. | |
| 6,078,854 A | 6/2000 | Breed et al. | |
| 8,836,494 B2 | 9/2014 | Reuschel et al. | |
| 8,874,301 B1 | 10/2014 | Rao et al. | |
| 2002/0149495 A1* | 10/2002 | Schach | G01D 11/28 340/815.78 |
| 2006/0017555 A1* | 1/2006 | Zimmermann | B60Q 1/441 340/467 |
| 2007/0268714 A1* | 11/2007 | Chen | B60K 37/02 362/510 |
| 2009/0129105 A1 | 5/2009 | Kusu et al. | |
| 2016/0325674 A1* | 11/2016 | Krull | G02B 6/001 |

OTHER PUBLICATIONS

"TouchSensors Design Guide" by ATMEL, 10620 D-AT42-04/09, Revised Apr. 2009, 72 pages, Copyrighted 2008-2009 Atmel Corporation.

\* cited by examiner

*Primary Examiner* — Kerri McNally
(74) *Attorney, Agent, or Firm* — Vichit Chea; Price Heneveld LLP

(57) ABSTRACT

An illuminated vehicle foot pedal assembly is provided that includes a foot pedal and at least one light source located on the foot pedal. The assembly further includes at least one proximate sensor disposed on the pedal for sensing an operator's foot proximate to the pedal. The at least one light source may illuminate the pedal and the foot well and may indicate a vehicle condition such as a driving mode or a warning. The sensed proximity of the foot may be used to control the lighting or a pedal adjustment.

16 Claims, 11 Drawing Sheets

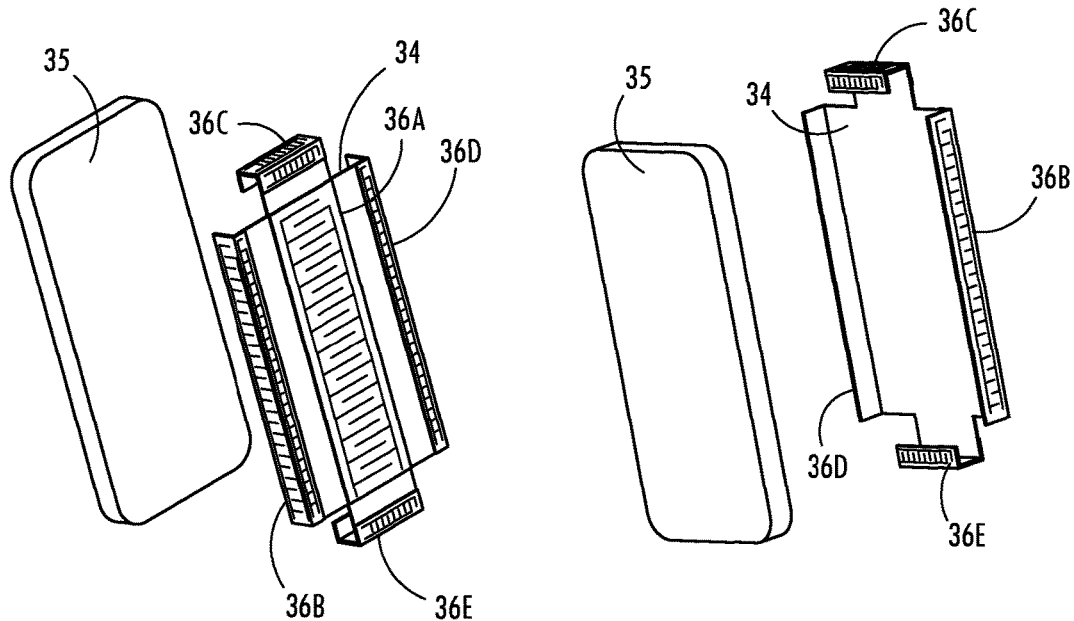
FIG. 6A  FIG. 6B
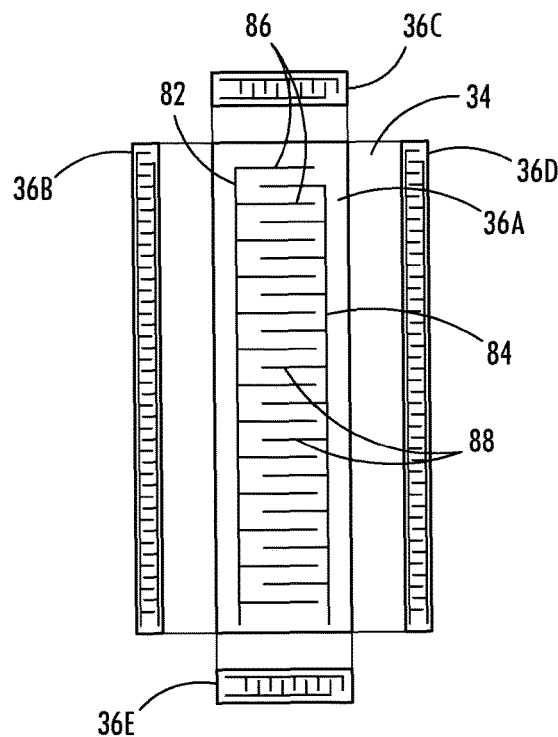
FIG. 7

ILLUMINATED VEHICLE FOOT PEDAL ASSEMBLY

FIELD OF THE INVENTION

The present invention generally relates to motor vehicle foot pedals, and more particularly relates to brake and/or accelerator foot pedals having enhanced lighting or proximity sensing.

BACKGROUND OF THE INVENTION

Automotive vehicles are commonly equipped with operator actuatable foot pedal assemblies located generally forward of the driver seat within the foot well area of the passenger compartment. The foot pedal assemblies are driver actuatable by a foot depression to control vehicle operation such as acceleration and braking of the vehicle. The foot pedal assemblies typically include an accelerator pedal for controlling acceleration of the motor vehicle, a brake pedal for controlling braking of the vehicle, and may also include a clutch pedal for controlling a clutch. The pedal assemblies typically have a foot pedal arranged and configured to be engaged by an operator's foot within the foot well region forward of the driver seat of the vehicle. During operator driven vehicle use, the foot pedals are actuatable during continuous use of the vehicle. With the increased interest in autonomous vehicles, the foot pedal assemblies may not always be employed to control the vehicle since the vehicle may be driven autonomously. It may be desirable to provide enhanced functionality of the foot pedal assemblies for automotive vehicles.

SUMMARY OF THE INVENTION

According to one aspect of the present invention, an illuminated vehicle foot pedal assembly is provided that includes a foot pedal, and at least one light source located on the foot pedal.

According to another aspect of the present invention, an illuminated vehicle foot pedal assembly includes a foot pedal located in a vehicle foot well. The illuminated vehicle foot pedal assembly also includes a plurality of light sources located on the pedal and comprising a first light source emitting light from a first side of the pedal and a second light source emitting light from a second side of the pedal.

According to yet another aspect of the present invention, an illuminated vehicle foot pedal assembly is provided. The assembly includes a foot pedal, and at least one proximity sensor disposed on the pedal for sensing an operator's foot proximate to the pedal. The assembly also includes at least one light source located on the foot pedal for illuminating light output in response to sensing the operator's foot proximate to the pedal.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6A is an exploded front perspective view of the proximity sensor assembly shown in FIG. 4;

FIG. 6B is an exploded rear perspective view of the proximity sensor assembly;

FIG. 7 is an enlarged front view of the proximity sensors provided on the proximity sensor assembly;

DETAILED DESCRIPTION OF THE PREFERRED EMBODIMENTS

Figure 1:
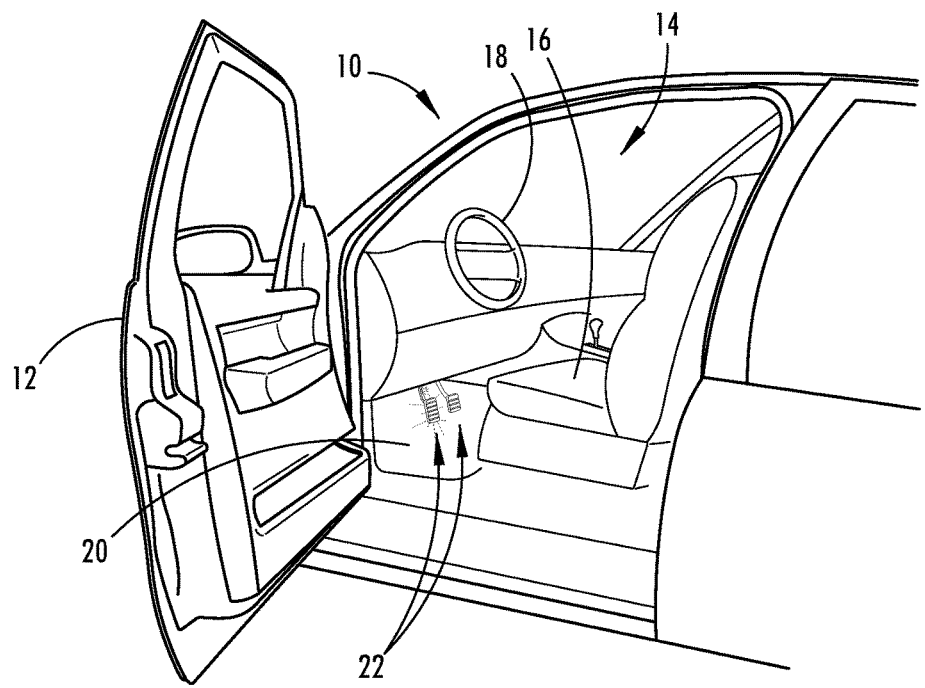
FIG. 1 is a side perspective view of a portion of a vehicle having a plurality of foot pedal assemblies equipped with lighting and proximity sensors, according to one embodiment.
Figure 2:
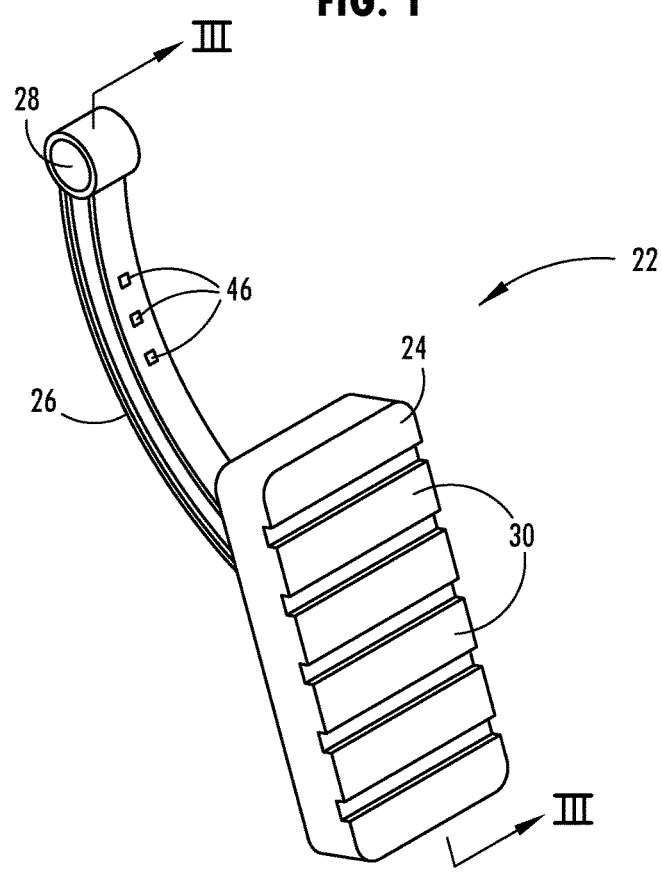
FIG. 2 is an enlarged perspective view of one of the foot pedal assemblies shown in FIG. 1.
Figure 3:
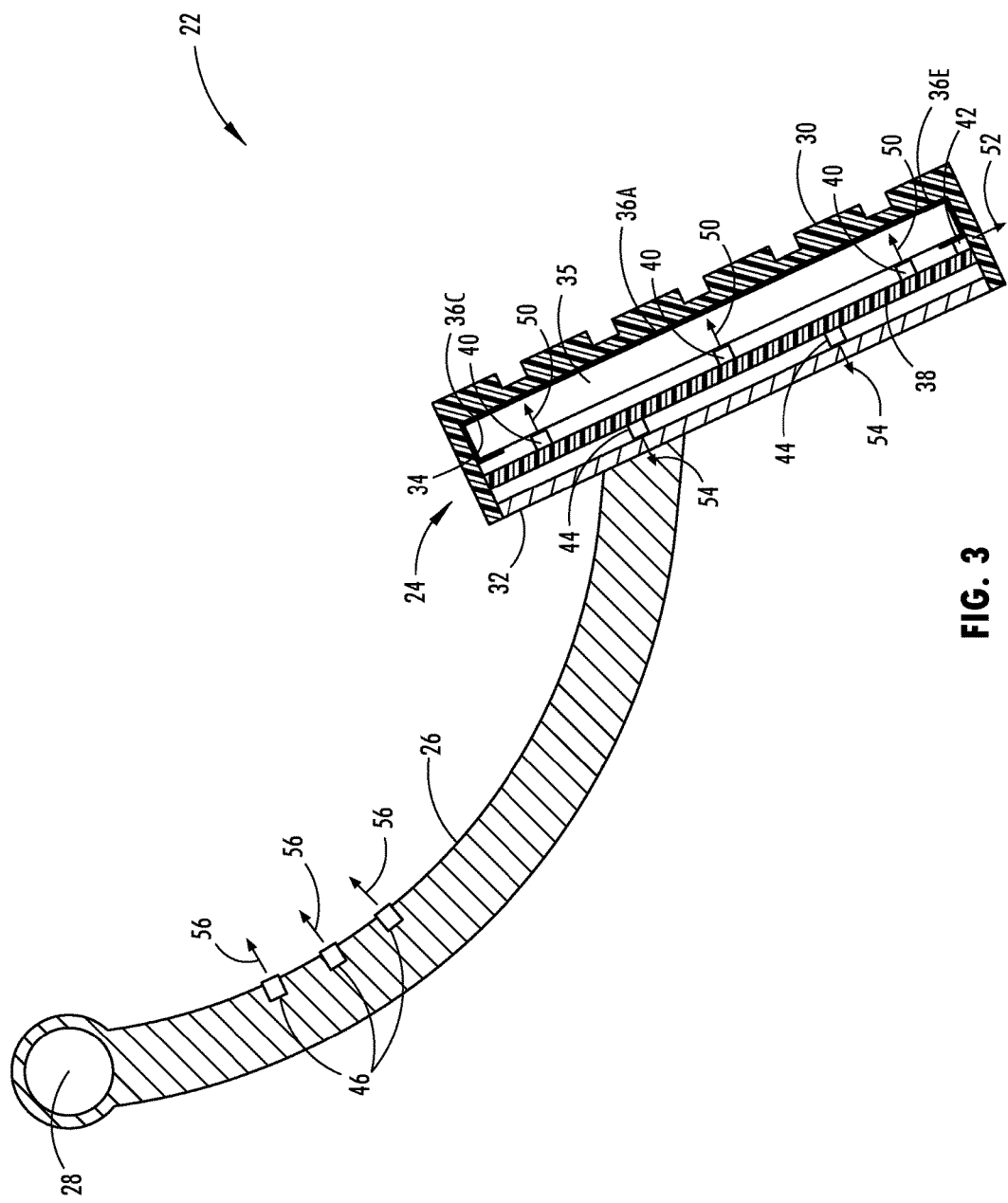
FIG. 3 is an enlarged cross-sectional view taken through line of FIG. 2 further illustrating the foot pedal assembly.
Figure 4:
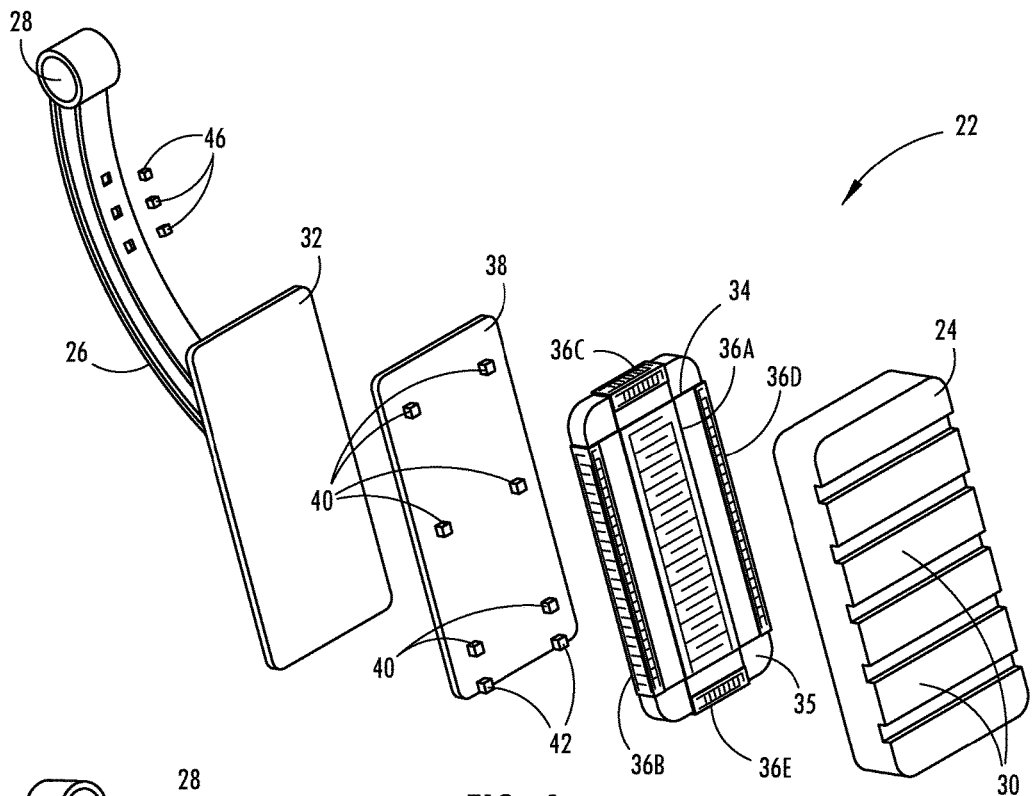
FIG. 4 is an exploded front perspective view of the foot pedal assembly further illustrating the pedal lighting and proximity sensors, according to one embodiment.
Figure 5:
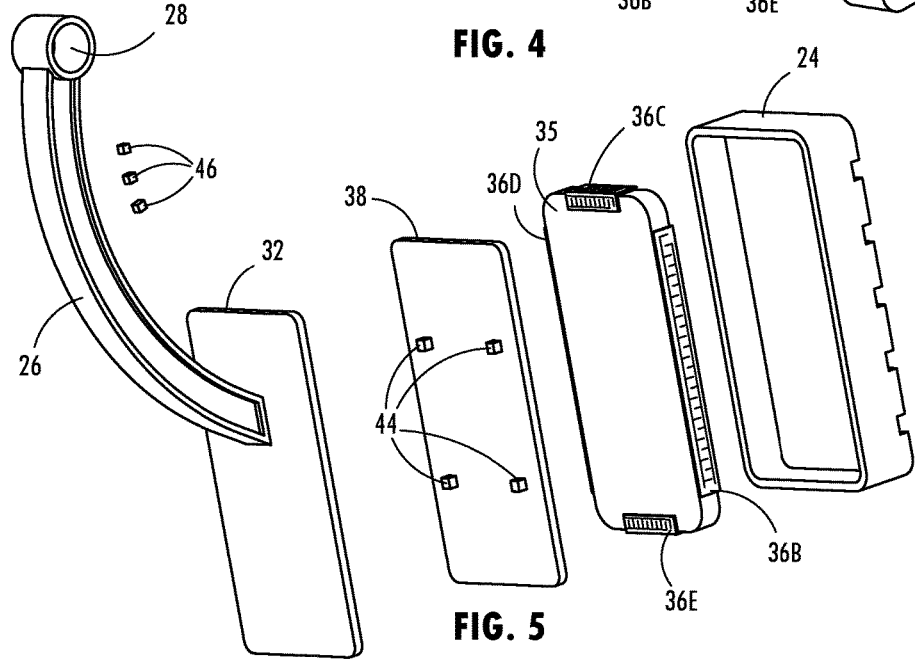
FIG. 5 is an exploded rear perspective view of the foot pedal assembly shown in FIG. 5.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a motor vehicle 10 is generally illustrated having a pair of foot pedal assemblies 22 that are configured to sense the proximity of a user such as a driver's foot and to illuminate light and perform other control functions, according to various embodiments. The motor vehicle 10 may be configured as a wheeled car, truck, van or other powered vehicle. The motor vehicle 10 is illustrated having a door 12 shown in the open position for allowing ingress and egress of one or more passengers (e.g., driver) within the passenger compartment 14. Located in the passenger compartment 14 is a driver seat 16 for seating the driver (not shown) of the vehicle 10. A steering wheel 18 is positioned forward of the driver seat 16 to enable the driver to steer the vehicle 10 when the vehicle 10 is operated in a manually operated mode. The vehicle 10 is shown having the pair of foot pedal assemblies 22 generally positioned within the foot well 20 of the passenger compartment 14. The foot pedal assemblies 22 are located forward of the driver seat 16 and are accessible by the driver such that a driver's foot may forcibly depress one or more of the foot pedal assemblies 22 to control acceleration and braking of the vehicle 10 during manual vehicle operation.

It should be appreciated that the vehicle 10 may be a driver commanded vehicle, according to one embodiment. According to another embodiment, the vehicle 10 may be an autonomous vehicle that may be automatically controlled by one or more controllers and sensors. The autonomous vehicle controls may control one or more features of the vehicle including steering, braking and acceleration without requiring driver interaction. In the driver commanded mode, the vehicle 10 is steered by the driver of the vehicle operating the steering wheel 18 to command the vehicle wheels to steer the vehicle on a desired path, the vehicle acceleration is controlled by the driver depressing the foot pedal assembly 22 that controls vehicle acceleration such as by applying fuel (e.g., gas to the engine), and the vehicle is braked by the driver depressing the foot pedal assembly 22 that controls vehicle braking. In the autonomous driving mode, the foot pedal assemblies 22 are not required to be actuated by the driver to accelerate and brake the vehicle, according to one embodiment.

One of the foot pedal assemblies 22 is illustrated in more detail in FIGS. 2-6, according to one embodiment. The foot pedal assembly 22 illustrated in these drawing figures may be the brake pedal assembly for controlling vehicle braking. However, it should be appreciated that the accelerometer pedal for controlling vehicle acceleration and the clutch pedal, if present, may likewise be configured as shown and described herein. The foot pedal assembly 22 is shown having a foot pedal 24 provided with a front pad 30 configured to be engaged by the foot of the driver. The pad 30 may include wear bumpers that extend forward with thick portions and are separated by thin portions. Foot pedal 24 also includes an arm 26 shown as an arcuate arm having a pivot mount structure 28 at one end opposite the front pad 30 in the form of a hollow cylinder. The arm 26 supports the foot pedal 24 and the pivot mount structure 28 allows the foot pedal 24 to rotate about a shaft between an extended, forward-biased non-depressed position and a depressed position when the driver pushes with force on the front pad 30 of the foot pedal assembly 22.

The foot pedal assembly 22 includes at least one light source located on the foot pedal for providing light illumination. In the embodiment shown, one or more first light sources 40 are mounted on the front side of a lighting circuit board 38 and face forward toward the front pad 30 to illuminate light through the front pad 30 and forward of the foot pedal 24. The foot pedal 24 forms a housing that covers the front and the sides and is connected to a base plate 32 on the outer end of arm 26. The foot pedal 24 and pad 30 may include a light transparent medium, such as clear silicone, that is light transmissive so that light may transmit through the foot pedal 24 and pad 30. The first light sources 40 may include a plurality of light emitting diodes (LEDs), according to one embodiment. The foot pedal assembly 22 further includes one or more second light sources 42 for illuminating the foot well area of the passenger compartment. The second light sources 42 are shown located near the bottom edge of the lighting circuit board 38 and include two downward facing LEDs for illuminating the foot well area with a generally downward directed light beam. The foot pedal assembly 22 may further include one or more third rearward facing light sources 44 in the form of LEDs located on the rear surface of the lighting circuit board 38 for illuminating the back side of the pedal 24 and hence that portion of the foot well area. In addition, one or more fourth light sources 46 are shown mounted on the front side of arm 26 for further illuminating the foot well area. Each of the light sources 40, 42, 44 and 46 may include LEDs such as RGB LEDs that can generate different colors of light such as red, green and blue light and combinations thereof that produce other colors such as an amber or yellow color, according to one embodiment. The light sources 40, 42, 44 and 46 may include any number of light sources.

The light sources 40, 42, 44 and 46 may provide different functions for illuminating the foot pedal assembly 22 and illuminating light within the foot well 20 of the vehicle 10. According to one embodiment, the light sources, such as the first light sources 40, may serve as vehicle warning lights to provide a readily recognizable light signal that is discernable to the driver of the vehicle and indicative of a vehicle warning. For example, the warning light may indicate a brake issue warning, a low tire pressure issue warning or a steering issue warning relating to the vehicle. To provide a warning indicator, the first light sources 40 on the brake pedal 24 may flash a particular color, such as red light, at high intensity to capture the driver's attention as a warning indicator. This warning indicator may be in addition to any warning provided in the instrument panel or a messaging center elsewhere on the vehicle. The warning signal may be indicative of other issues including an engine/transmission issue or other issues. Different color lights may be illuminated depending on the warning. For example, a red light may indicate a more severe warning such as a tire or brake issue, whereas another color light such as a yellow or amber light may communicate a less severe warning. In addition, the warning indicator lighting may be illuminated as a flashing light, according to one embodiment.

The foot pedal assembly lighting may also serve as decorative lighting and area lighting to illuminate the region of the foot well 20. This lighting may be provided by one or more of the light sources 40, 42, 44 and 46. For example, when the door of the vehicle is opened, a farewell lighting may be illuminated by the foot pedal assembly lighting 22. The farewell lighting may be a soft low light intensity or a higher intensity light that serves as an area light. It should further be appreciated that a user activated switch may be included to enable a user to selectively turn on the ambient foot well lighting.

During the autonomous driving mode, the color of light illuminated by the first light sources 40 may be of a select color, such as a pulsing yellow or amber color, to indicate that the vehicle is operating in the autonomous driving mode such that the lighting serves to warn the driver of the vehicle 10 that the driver should not engage the foot pedal assemblies 22. In one example, the amber light may repeatedly ramp in light intensity between 30% and 100% of full power for a time period such as two seconds. The amber color light may not turn off in intensity, but would increase to 100% and decrease to 30% at a slow ramping rate and repeat the ramping cycle. The light sources 40 may ramp smoothly rather than an abrupt on/off repeating pattern as would be present in other warning signals. In addition, the foot pedal lighting may be utilized to warn the driver if a driver's foot is detected near the pedals, such that the driver does not inadvertently engage the pedals. This may be achieved by sensing the driver's foot position with the use of proximity sensors provided in the foot pedal assembly 22 as described herein. In addition, if the driver's foot is within a certain distance of the pedal, such as two inches, an audible alarm or other warning may sound to signal or warn the driver not to touch the foot pedals.

The vehicle foot pedal assembly 22 is further configured to include at least one proximity sensor located on the foot pedal for sensing an operator, e.g., driver's foot, in close proximity to the foot pedal 24. The at least one proximity sensor may include at least one capacitive sensor, according to one embodiment. In the embodiment shown, five proximity sensors 36A-36E in the form of capacitive sensors are shown formed on a flex circuit board 34 that is disposed rearward and in close proximity to the front pad 30. Each of the proximity sensors 36A-36E is positioned to generate an electric field generally forward of the front pad 30 so as to sense the presence of a driver's foot in close proximity to the pad 30. As such, the proximity sensors 36A-36E detect when an operator's foot is within a certain distance of the pedal. In addition, one or more of the proximity sensors wrap around a side and back portion of the flex circuit 34 and may detect the presence of the driver's foot on one side of the front pad 30 or behind the pad 30. The detection of a driver's foot in close proximity to the pad 30 by the proximity sensors 36A-36E may be used to control the illumination of the light sources such as to provide a warning light to the driver not to touch the foot pedal assembly 22 during the autonomous driving mode. Additionally, the foot pedal assembly 22 may be adjusted in its position, such as the height and/or forward/rearward movement of the pedal 30 based on a sensed position of the driver's foot by the proximity sensors 36A-36E. For example, the proximity sensors 36A-36E may sense a position of the foot relative to the pad 30 and determine if the pad 30, and thus the foot pedal assembly 22, should be moved closer to the driver's foot during the driver commanded pedal adjustment mode. This may be achieved by employing a pedal height adjuster such as a motor that responds to a pedal adjustment input to move the vehicle pedal assembly 22 up/down, left/right, or fore/aft into a better fitting position based on the sensed foot position.

The proximity sensors 36A-36E may be configured as capacitive sensors, according to one embodiment. The five proximity sensors 36A-36E are shown having four sensors located near the upper, lower, left and right sides of the pedal and one larger sensor at the center of the flex circuit 34 and operate to sense a user, such as a driver's foot(s), in contact with or in close proximity to the pedal 24. Sensors 36B and 36D extend onto the respective left and right sides of the flex circuit 34 to sense the foot proximate that side. Sensors 36C and 36E extend onto the respective top and bottom sides and the rear side of the flex circuit 34 to sense the foot proximate that side. The capacitive sensors 36A-36E each may be configured having a drive electrode 82 and a receive electrode 84, each having interdigitated conductive fingers 86 or 88, respectively, for generating a capacitive electric field. One example of the electrode and interdigitated finger arrangement of the capacitive sensor 36A is illustrated in FIGS. 6A-7. Capacitive sensors 36A-36E may likewise be configured with similar electrodes and interdigitated fingers.

The proximity sensors 68A-68E may each be formed by printing conductive ink onto the top surface of a polymeric or otherwise dielectric substrate provided by the flexible circuit 34, or may be provided on a bottom surface thereof. The flex circuit 34 is shown extending partially around a light transparent backing member 35. It should be appreciated that the flex circuit 34 and member 35 may be visibly transparent or light transmissive to allow light to pass therethrough from the first light sources 40 to the front and sides of pad 30. It should also be appreciated that the proximity sensors 36A-36E may otherwise be formed such as by assembling conductive preformed conductive circuit traces onto a substrate, according to other embodiments.

The drive electrode 82 may receive square wave drive pulses applied at a voltage, while the receive electrode 84 has an output for generating an output voltage. It should be appreciated that the electrodes 82 and 84 may be arranged in various other configurations for generating the capacitive field as the activation field. The drive electrode 82 may be applied with a voltage input as square wave pulses having a charge pulse cycle sufficient to charge the receive electrode 84 to a desired voltage. The receive electrode 84 thereby serves as a measurement electrode. When a user or operator, such as the driver's foot, enters an activation field generated by one or more sensors, the corresponding proximity sensors 36A-36E detect a disturbance caused by the foot to the activation field(s) and a controller determines whether the disturbance is sufficient to indicate a position of the user's foot in relation to the pedal. The disturbance of the activation field is detected by processing the charge pulse signal associated with the corresponding signal channel associated with each proximity sensor. Each proximity sensor has its own dedicated signal channel generating charge pulse counts which are processed to determine a sensed condition. A controller or control circuitry may be included to process the activation field of each proximity sensors to sense user activation of the corresponding sensor by comparing the activation field to one or more thresholds. It should be appreciated that analog and/or digital control circuitry may be employed to process each activation field, determine user proximity sensing, and initiate a control action. The control circuitry may employ a QMatrix acquisition method available by ATMEL®, according to one embodiment. According to another embodiment, a QTouch capacitive sensing technology may be employed in which a single data acquisition channel may be used for each sensor. Other capacitive sensing technologies may be employed, according to other embodiments.

According to another embodiment, the proximity sensors 36A-36E may be configured each with a single electrode whereby the driver's foot provides a ground such that close proximity of the foot to the electrode generates a signal indicative of the position of the foot relative to the pedal.

It should be appreciated that the sense activation field of each proximity sensor is a capacitive electric field in the exemplary embodiment and that the user's foot has electrical conductivity and dielectric properties that cause a change or disturbance in the sense activation field as should be evident to those skilled in the art. However, it should be appreciated by those skilled in the art that additional or alternative types of proximity sensors can be used, such as, but not limited to, inductive sensors, optical sensors, temperature sensors, resistive sensors, the like, or a combination thereof. Exemplary proximity sensors are described in the Apr. 9, 2009 ATMEL® Touch Sensors Design Guide, 10620 D-AT42-04/09, the entire reference hereby being incorporated herein by reference.

Figure 8:
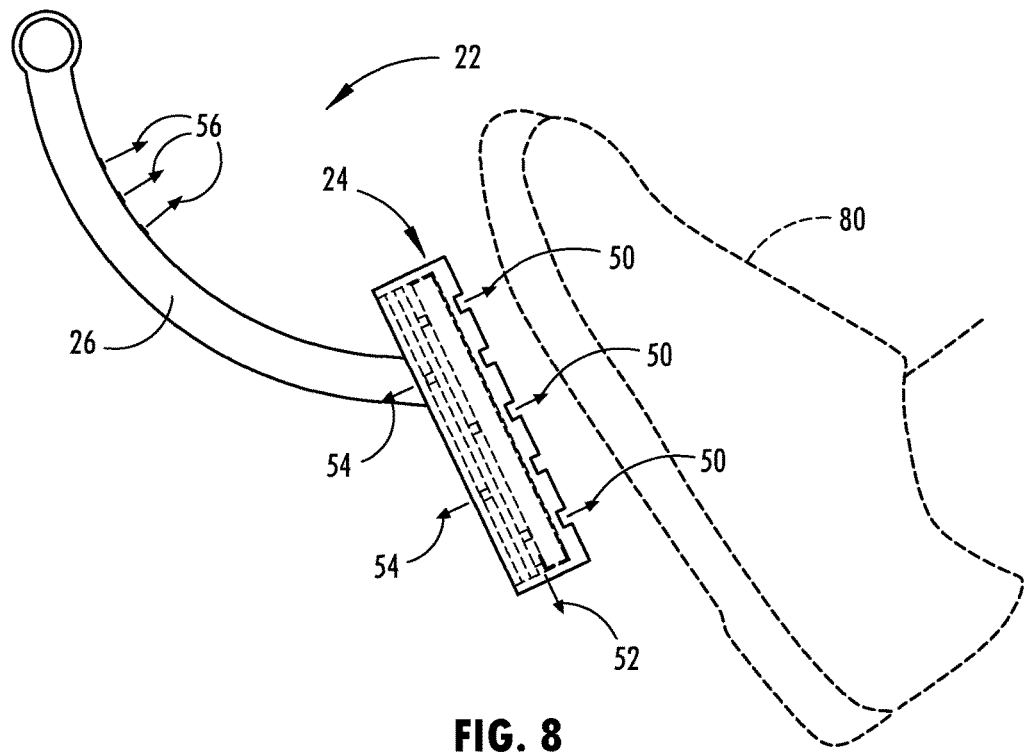
FIG. 8 is a side view further illustrating the foot pedal assembly and showing a driver's foot proximate thereto.

Referring to FIG. 8, a user's foot 80 is shown interacting with the foot pedal assembly 22 and being detected by the proximity sensors 36A-36E. In this embodiment, the pedal assembly 22 employs the capacitive proximity sensors to detect the position of the foot 80, each of which generates an activation field. As the user's foot 80 or other body part interacts with the activation field for a corresponding proximity sensor, a signal is generated and processed by control circuitry to detect the foot 80 in contact or close proximity to the corresponding foot pedal. The control circuitry may detect when the foot 80 is within a certain distance, such as two inches, of the foot pedal and provide control action based thereon. In other embodiments, the control circuitry may detect when the foot 80 is in very close distance or contact with the pedal. Further, control circuitry may determine when the foot 80 is moving over the surface of the foot pedal by detecting a change in the signals generated by the proximity sensors relative to one another. Thus, a swiping movement of the foot 80 may be detected. Also shown in FIG. 8 are the various light outputs generated by the light sources. A first lighting output 50 is shown illuminating forward of the pedal 24 due to light output from the first light sources 40. The first light output 50 provides a front pedal illumination. A second light output illumination 52 is shown in a light beam generally directed downward from the pedal 24 and generated by the second light sources 42. The second light output 52 illuminates the floor of the foot well area. A third light output 54 is shown illuminating rearward of the pedal 24. The third light output 54 is generated by the third light sources 44 to illuminate the back side of the foot well area. A fourth light output 56 is generated by the fourth light sources 46 on arm 26 and generally is directed forward above the pedal 24 to illuminate the upper portions of the foot well area.

Figure 9:
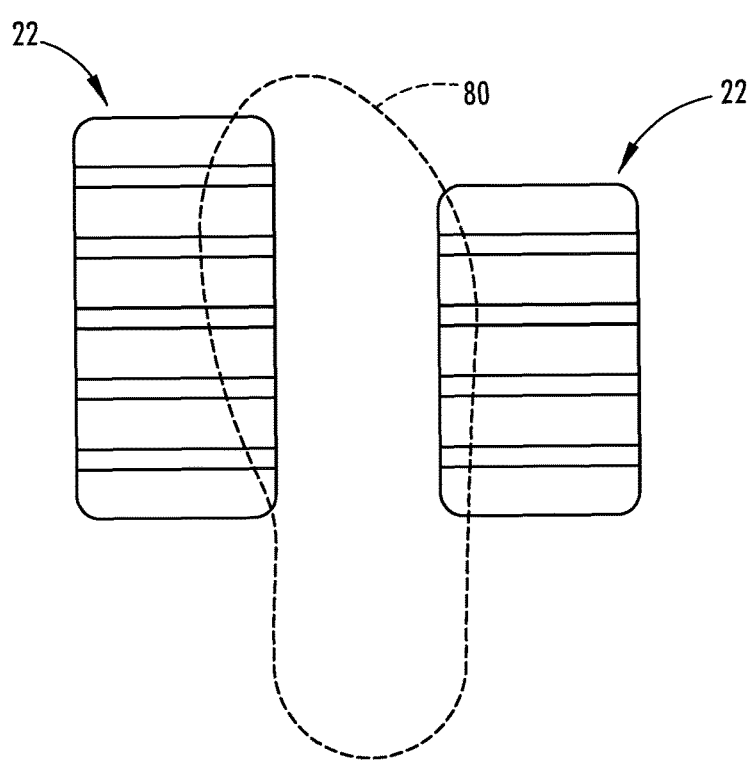
FIG. 9 is a front view of two foot pedal assemblies and a driver's foot overlaying both pedal assemblies.

The driver's foot 80 may assume a number of positions on or in close proximity to the foot pedal 24. During a normal driving condition, the driver's foot 80 will contact and depress the foot pedal 24 to provide a driver command input. The foot 80 may also be positioned below the pedal or behind the pedal 24 and such positioning may be detected with the use of the proximity sensors. Additionally, the foot 80 may be positioned to overlay and even contact both foot pedals 22 as shown in FIG. 9. In this situation, the proximity sensors within both of the foot pedal assemblies 22 may detect that a common foot or that two feet are in close proximity or in contact with two pedals at the same time. Such an event may be detected by the controller and a warning may be provided to the vehicle operator.

Referring now to FIGS. 10A-10E, various signal responses generated by the proximity sensors due to different foot positions or movements are illustrated according to various examples. In each of these examples, the signals CH1-CH5 are shown for respective proximity sensors 36A-36E. Each of the signals CH1-CH5 shows the change in the sensor charge pulse count shown as Δ sensor count for a plurality of signal channels CH1-CH5 associated with the five proximity sensors 36A-36E is illustrated, according to one example. The change in sensor charge pulse count is the difference between an initialized reference count value without a foot or other object present in the activation field and the corresponding sensor reading. Each of the signal channels CH1-CH5 are processed by control circuitry to determine the position of the foot and motion of the foot relative to the foot pedal.

Figure 10A:
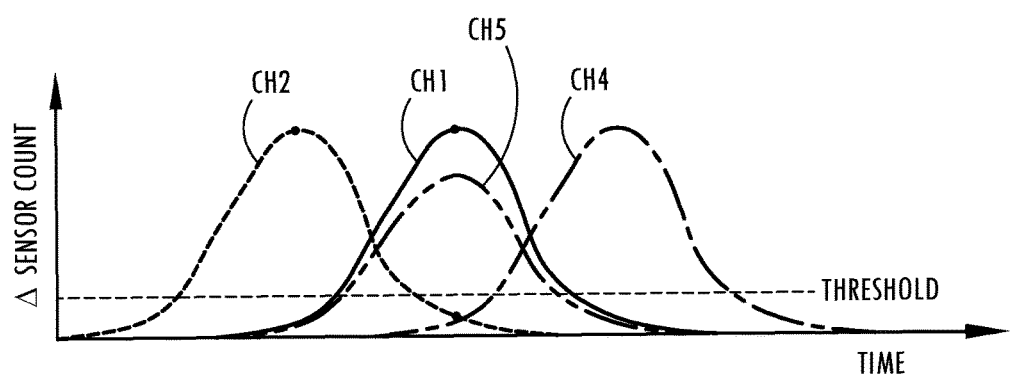
FIG. 10A is a graph illustrating sensed signals generated by the proximity sensors during user interaction of the foot moving across the foot pedal.

In the example shown in FIG. 10A, the user's foot enters the activation field associated with each of the proximity sensors as the user's foot moves across the foot pedal. The signal channel is the change 4 in sensor charge pulse count associate with the corresponding capacitive sensors. In this first example, signals CH1, CH2, CH4 and CH5 produced by each of sensors 36A, 36B, 36D and 36E, respectively, are detected exceeding a threshold as the user's foot moves across the middle and lower portion of the pedal from the left side to the right as seen in sensor arrangement of FIG. 7. When this happens, the third proximity sensor 36C on top does not detect the foot as the foot is in a lower position. The controller may thereby detect the location of the foot and the movement of the foot relative to the pedal by processing the signals CH1-CH5.

Figure 10B:
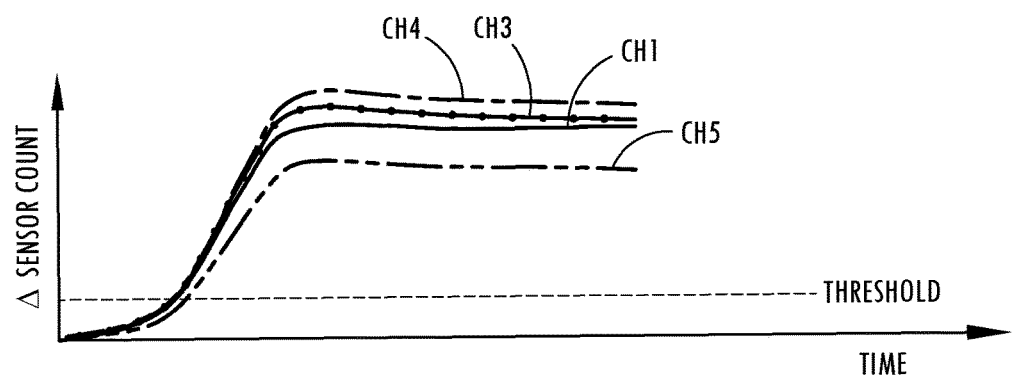
FIG. 10B is a graph illustrating sensed signals generated by the proximity sensors during user interaction when a foot engages the right half of the pedal.

In the example shown in FIG. 10B, the proximity sensors detect the foot engaging the foot pedal with the foot being located on the right half of the pedal. As such, proximity sensor 36D on the right side has the highest signal and signal 90B associated with the sensor on the left side of the pedal detects no signal. As such, the position of the foot being on the right side of the pedal may be detected in this situation.

Figure 10C:
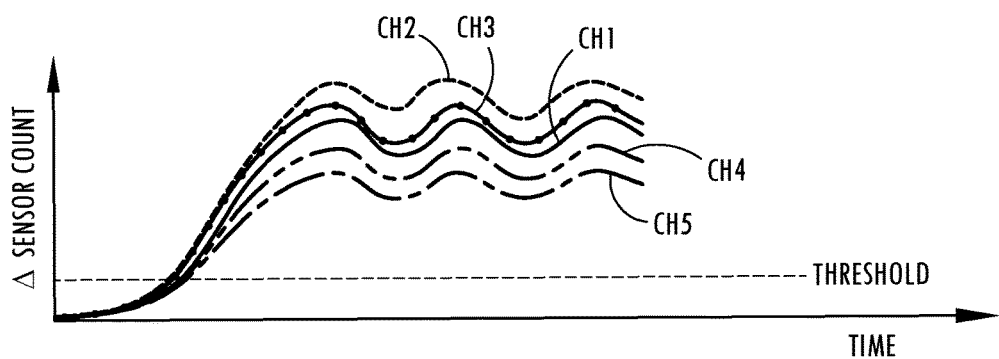
FIG. 10C is a graph illustrating sensed signals generated by the proximity sensors during user interaction when a foot faces the pedal during vehicle motion.

In the example shown in FIG. 10C, the proximity sensors 36A-36E detect the driver's foot facing the pedal in close proximity while the vehicle is in motion. In this example, the foot is distanced from the pedal but does not contact the pedal. The controller may process the signals to detect the distance between the foot and pedal based on the strength of the signals CH1-CH5.

Figure 10D:
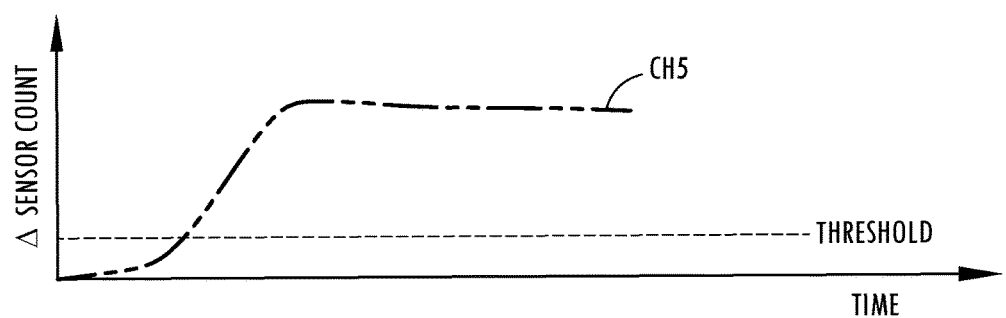
FIG. 10D is a graph illustrating sensed signals generated by the proximity sensors during user interaction with the foot underneath the pedal.

Referring to FIG. 10D, in this example, the driver's foot is located underneath the pedal when the foot is on the right half of the pedal. When this occurs, the fifth proximity sensors 36E located on the bottom of the pedal detects the foot extending behind the pedal due to the rearward extending portion of the proximity sensor 36E on the back side of the flex circuit 38. When this occurs, the pedal assembly may determine that the foot is behind the pedal and the operator may be warned to remove the foot from behind the pedal.

Figure 10E:
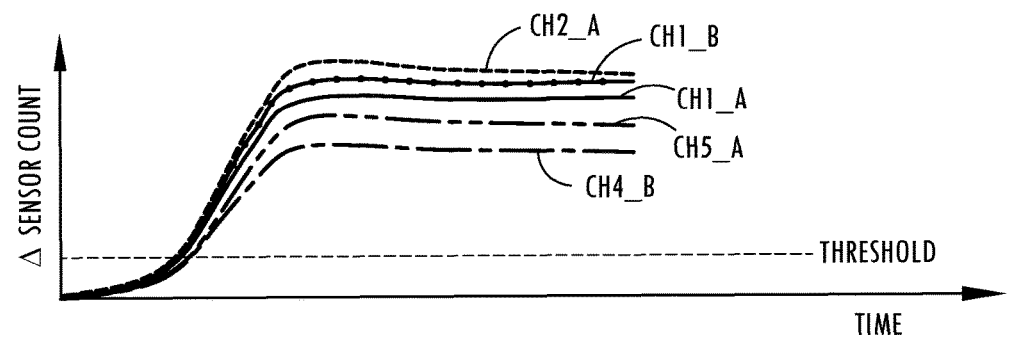
FIG. 10E is a graph illustrating sensed signals generated by the proximity sensors during user interaction with the foot engaging two pedals.

Referring to FIG. 10E, in this example, the foot or multiple feet are detected engaging two of the foot pedal assemblies simultaneously such as is shown in the example of FIG. 9. When this occurs, signals are sensed by the proximity sensors on both of the first and second pedal assemblies 22. Signals CH1A, CH2A and CH5A are generated by sensors 36A, 36B and 36E on the right side pedal, while signals CH1B and CH4B are generated by sensors 36A and 36D on the left side pedal. The foot is detected located on adjoining sides of each of the corresponding pedal assemblies. When this occurs, the driver may be warned to not contact both of the foot pedal assemblies at the same time with one or two feet.

Figure 11:
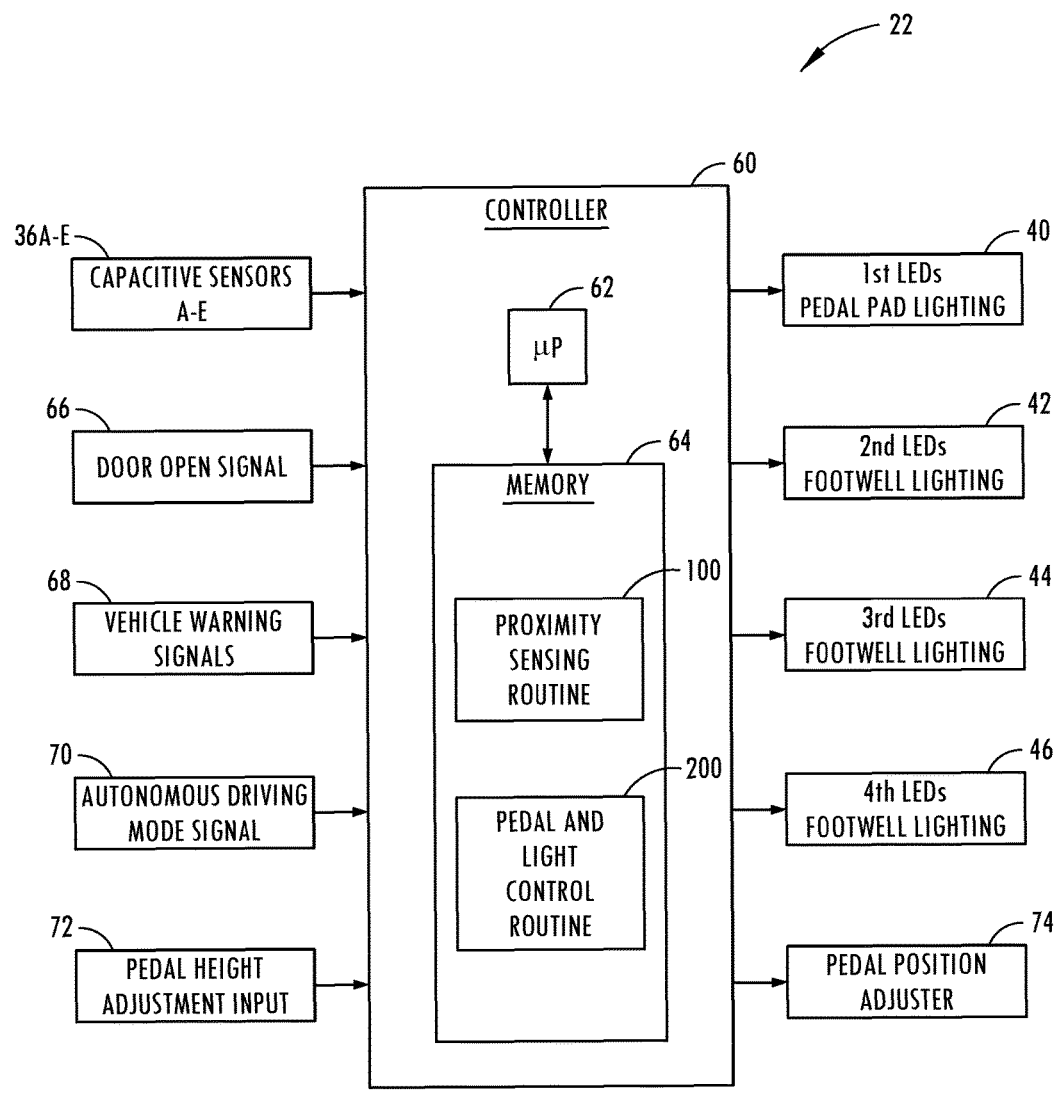
FIG. 11 is a block diagram illustrating the foot pedal assembly and control features therefor.

Referring to FIG. 11, the foot pedal assembly 22 is further illustrated having a controller 60 for receiving various inputs and controlling various outputs, according to one embodiment. The controller 60 may include a microprocessor 62 and memory 64. It should be appreciated that the controller 60 may include other analog and/or digital circuitry. The controller 60 receives inputs including inputs from each of the capacitive sensors 36A-36E. In addition, the controller 60 receives a door open signal 66 and vehicle warning signals 68. Further, the controller 60 receives an autonomous driving mode signal 70 and a pedal height adjustment input 72. The pedal height adjustment input may be a user input switch or touch screen input for selecting a pedal height for the user. The controller 60 processes the various inputs by executing routines 100 and 200 stored in memory 64. Routine 100 is a proximity sensing routine for determining the proximity of a driver relative to the foot pedal assembly. Routine 200 is a pedal and light control routine for controlling the lighting sources and the pedal adjustment, according to one embodiment. The controller 60 generates various outputs for controlling the first light sources 40 for pedal lighting and the second, third and fourth light sources for foot well lighting. In addition, the controller 60 may generate an output control signal for controlling the position of the pedal via a pedal position adjuster 74.

Figure 12:
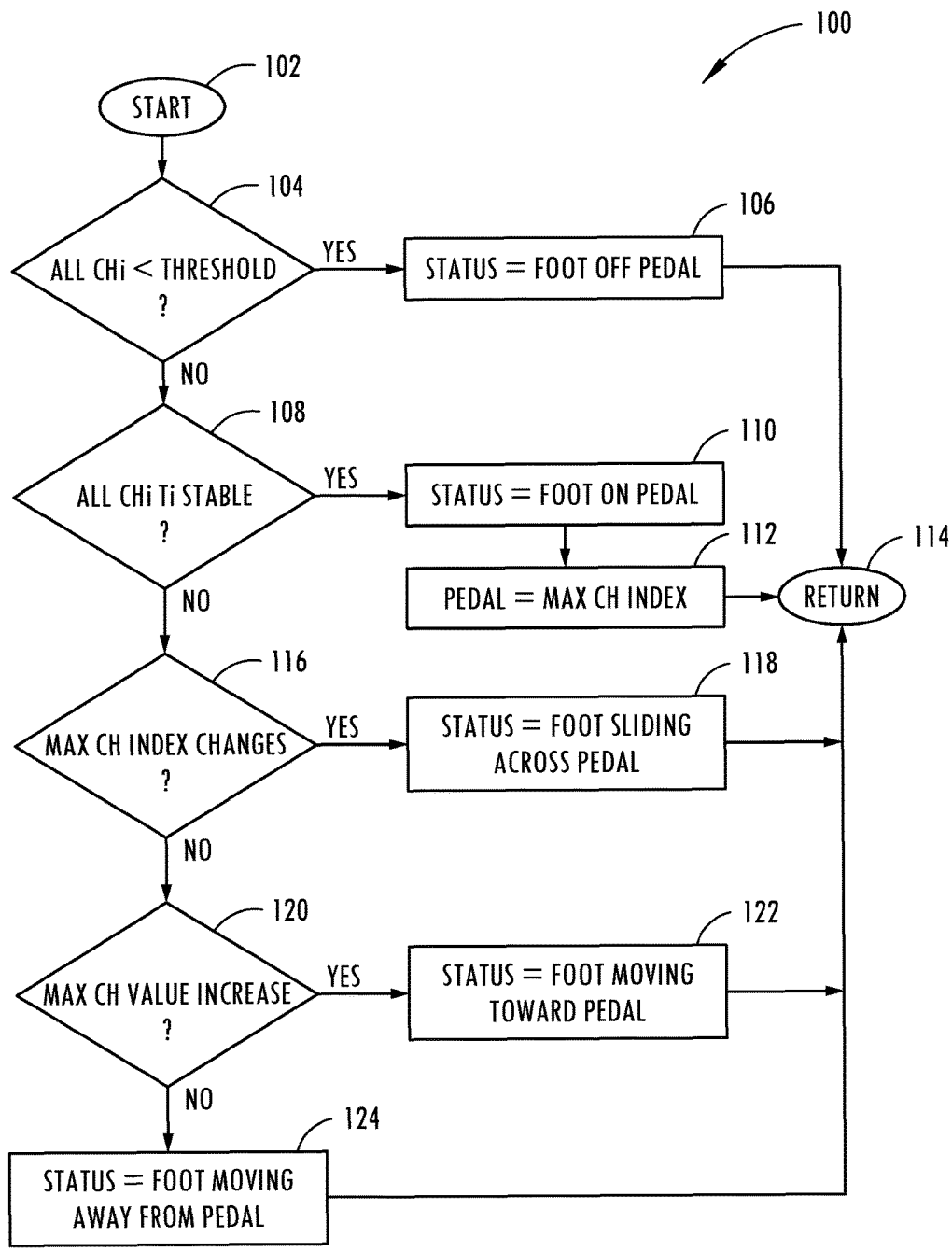
FIG. 12 is a flow diagram illustrating a control routine for sensing foot pedal interaction and determining the foot pedal assembly status.

Referring to FIG. 12, one embodiment of the proximity sensing routine 100 is shown. Routine 100 begins at step 102 and proceeds to decision step 104 to determine if all of the signal channels CHi associated with the proximity sensors are below a threshold and, if so, proceeds to step 106 to set the status indicative of the driver's foot being located off of the pedal. If all of the signal channels are not below the threshold, indicative of at least one or more of the signal channels being equal to or greater than the threshold, then routine 100 proceeds to decision step 108 to determine if all of the signal channels are stable. If all of the signal channels are stable, routine 100 proceeds to step 110 to set the status indicative of the foot being located on the pedal, and then proceeds to step 112 to set the pedal equal to the maximum channel index, before returning at step 114. If any of the signal channels are not stable, routine 100 proceeds to decision step 116 to determine if the maximum signal channel index changes and, if so, sets the status indicative of a foot sliding across the pedal at step 118, before returning at step 114. If the maximum signal channel index does not change, routine 100 proceeds to decision step 120 to determine if the maximum signal channel value increases and, if so, sets the status indicative of the foot moving toward the pedal at step 122, before returning at step 114. If the maximum signal channel value does not increase, routine 100 proceeds to step 124 to set the status indicative of a foot moving away from the pedal before returning at step 114.

Figure 13A:
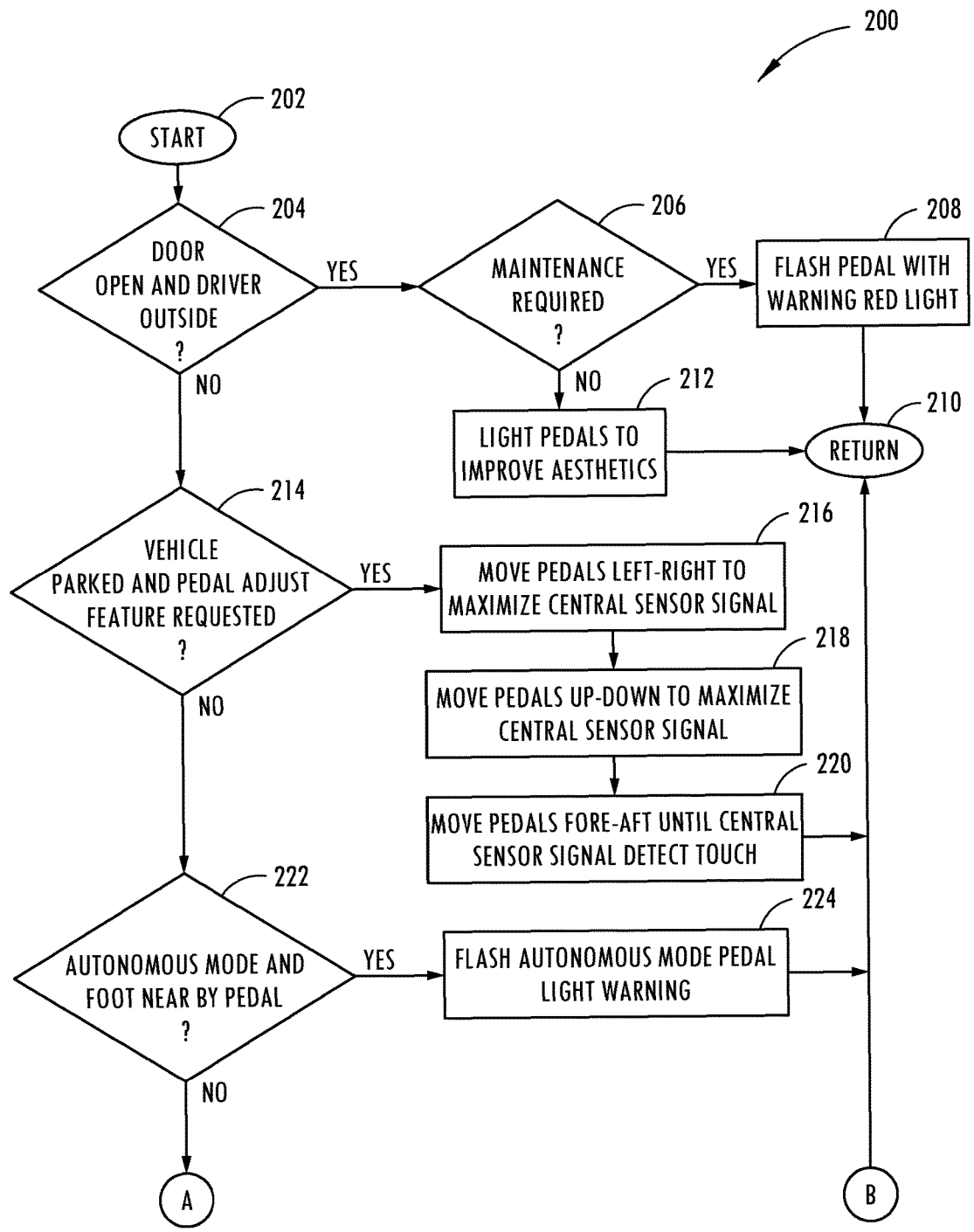
FIGS. 13A-13B are a flow diagram illustrating a control routine for sensing proximity of a user's foot and controlling lighting and pedal adjustment features, according to one embodiment.
Figure 13B:
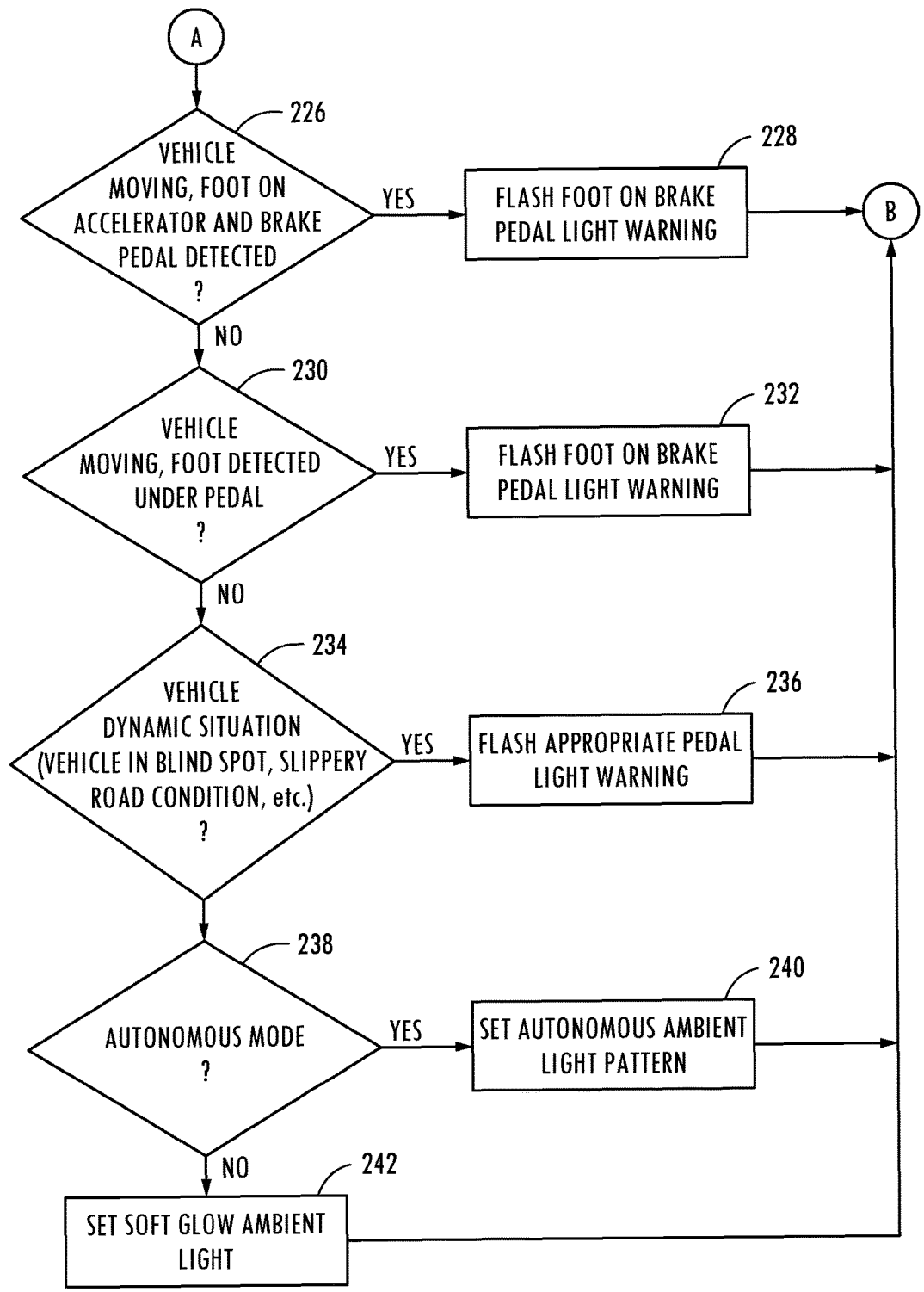

Referring to FIGS. 13A-13B, the pedal and light control routine 200 is illustrated, according to one embodiment. In this embodiment, routine 200 begins at step 202 and proceeds to decision step 204 to determine if the driver door is open and the driver is located outside of the vehicle. This may be determined with the use of a door sensor and driver detection sensor, e.g., seat sensor. If the door is open and the driver is outside, routine 200 proceeds to decision step 206 to determine if vehicle maintenance is required and, if so, activates light sources to illuminate to flash the foot pedal with a red warning light at step 208 before returning at step 210. If no maintenance is required, routine 200 proceeds to step 212 activate light sources to illuminate light with the foot pedals to provide enhanced aesthetics at step 212 before returning at step 210.

Returning to decision step 204, if the door is not open or the driver is not outside the vehicle, routine 200 proceeds to decision step 214 to determine whether the vehicle is parked and the pedal adjust feature has been requested. When the vehicle is parked and the pedal adjust feature has been requested, such as by a driver input, routine 200 proceeds to step 216 to move the pedals left or right to maximize the central proximity sensor signal. In addition, at step 218, the foot pedals may be moved up or down to maximize the central proximity sensor signal. Further, the foot pedals may be moved fore and aft until the central proximity sensor signal detects a touch on the user's foot at step 220, before returning at step 210. Accordingly, the foot pedals may be adjusted in position based on the sensed position of the foot with the capacitive sensors and adjusted to a desired position pursuant to the adjust feature.

If the vehicle is not parked or the pedal adjust feature has not been requested, routine 200 proceeds to decision step 222 to detect if the vehicle is in the autonomous mode and a foot is detected near the pedal. When this occurs, the foot pedal light warning flashes as an indication of the autonomous driving mode at step 224. This may be achieved by the first light sources flashing a light of a red color to indicate to the driver to remove the foot from the pedal. If the autonomous mode and presence of a foot is not detected near the vehicle pedal, routine 200 proceeds to decision step 226 to determine if the vehicle is moving and a foot is detected on both the accelerator and brake pedals. If this occurs, routine 200 proceeds to step 228 to flash the foot on brake pedal light warning at step 220 before returning. If the vehicle is not moving or if the foot is not on both the accelerator and brake pedal, routine 200 proceeds to decision step 230 to determine if the vehicle is moving and the foot is detected under the foot pedal. When this occurs, routine 200 proceeds to step 232 to flash the foot on brake pedal light warning before returning. If the vehicle is not moving or the foot is not detected under the pedal, routine 200 proceeds to decision step 234 to determine a vehicle dynamic situation, such as another vehicle in the blind spot, a slippery road condition, etc., and if so, flashes the appropriate pedal light warning at step 236 before returning. If no vehicle dynamic situation exists, routine 200 proceeds to decision step 238 to determine if the vehicle is operating in the autonomous mode. When the vehicle is operating in an autonomous mode, routine 200 proceeds to step 240 to set the autonomous ambient light pattern before returning. This may include illuminating the first light sources with a ramping amber light color that transitions between full power and partial power and cyclically ramps back and forth. If the vehicle is not in the autonomous mode, routine 200 proceeds to step 242 to set a soft glow ambient light with any of the vehicle pedals lighting sources 40, 42, 44 and 46, before returning.

Accordingly, the foot pedal assembly 22 advantageously senses the relative position of a driver's foot relative to one or more of the pedal assemblies and provides controllable features based thereon. Additionally, the foot pedal assembly 22 advantageously provides for light illumination to illuminate the foot pedals. The light illumination may be indicative of an operating mode of the vehicle such as an autonomous operating mode. Lighting of the foot pedals may further be indicative of one or more warning situations to provide a warning to the vehicle driver. Further, the light sources may provide ambient and local lighting within the foot well of the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illuminated vehicle foot pedal assembly comprising:
   a foot pedal;
   at least one light source located on the foot pedal for illuminating light rearward of the pedal in at least a portion of a foot well area;
   at least one proximity sensor disposed on the pedal for sensing an operator's foot proximate to the pedal; and
   a controller for controlling illumination of the at least one light source based on the sensed proximity of the foot.

2. The assembly of claim 1, wherein the foot pedal further comprises a housing comprising a light transparent medium, wherein the at least one light source is located within the housing.

3. The assembly of claim 2 further comprising a circuit board located within the housing and containing a plurality of light sources.

4. The assembly of claim 1, wherein at least one light source comprises a plurality of light sources.

5. The assembly of claim 4, wherein the plurality of light sources comprises a first plurality of light sources for illuminating a front surface of the pedal and a second plurality of light sources for illuminating the light rearward of the pedal in at least the portion of the foot well area.

6. The assembly of claim 1, wherein the controller detects a vehicle condition and illuminates the at least one light source responsive to the detected vehicle condition.

7. The assembly of claim 6, wherein the at least one vehicle condition is an autonomous driving mode.

8. The assembly of claim 6, wherein the at least one light source provides a warning light indicative of the vehicle condition.

9. An illuminated vehicle foot pedal assembly comprising:
   a foot pedal located in a vehicle foot well;
   a plurality of light sources located on the pedal and comprising a first light source emitting light from a first side of the pedal forward of the pedal and a second light source emitting light from a second side of the pedal rearward of the pedal in at least a portion of a foot well area;
   a housing comprising a light transparent medium, wherein the at least one light source is located within the housing; and
   a circuit board located within the housing, and containing the first tight source on the first side and the second light source on the second side.

10. The assembly of claim 9, wherein the first light source illuminates a front surface of the pedal and the second light source illuminates the foot well area.

11. The assembly of claim 9, wherein the first light source comprises a first plurality of light emitting diodes and the second light source comprises a second plurality of light emitting diodes.

12. The assembly of claim 9 further comprising at least one proximity sensor disposed on the pedal for sensing an operator's foot proximate to the pedal.

13. The assembly of claim 12 further comprising a controller for controlling illumination of the at least one light source based on the sensed proximity of the foot.

14. The assembly of claim 13, wherein the controller detects a vehicle condition and illuminates the at least one light source responsive to the detected vehicle condition.

15. The assembly of claim 14, wherein the at least one vehicle condition includes at least one of an autonomous driving mode and a warning light indicative of the vehicle condition.

16. An illuminated vehicle foot pedal assembly comprising:
   a foot pedal;
   at least one proximity sensor disposed on the pedal for sensing an operator's foot proximate to the pedal; and
   at least one light source located on the foot pedal for illuminating light output in response to sensing the operator's foot proximate to the pedal.

\* \* \* \* \*

UNITED STATES PATENT AND TRADEMARK OFFICE
CERTIFICATE OF CORRECTION

PATENT NO. : 9,975,476 B2  
APPLICATION NO. : 15/291302  
DATED : May 22, 2018  
INVENTOR(S) : Salter et al.

Page 1 of 1

It is certified that error appears in the above-identified patent and that said Letters Patent is hereby corrected as shown below:

In the Claims

Column 12:  
Claim 9, Line 1:  
"housing, and" should be --housing and--.  
Claim 9, Line 2:  
"tight" should be --light--.

Signed and Sealed this  
Thirty-first Day of July, 2018

Andrei Iancu  
*Director of the United States Patent and Trademark Office*